United States Patent
Gomes

(10) Patent No.: US 11,556,345 B2
(45) Date of Patent: Jan. 17, 2023

(54) DETECTING AND RECOVERING LOST ADJUNCT PROCESSOR MESSAGES

(71) Applicant: INTERNATIONAL BUSINESS MACHINES CORPORATION, Armonk, NY (US)

(72) Inventor: Louis P. Gomes, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/303,788

(22) Filed: Jun. 8, 2021

(65) Prior Publication Data

US 2022/0391213 A1 Dec. 8, 2022

(51) Int. Cl.
*G06F 9/38* (2018.01)
*G06F 9/54* (2006.01)

(52) U.S. Cl.
CPC ............ *G06F 9/3855* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 5,440,688 A | 8/1995 | Nishida | |
| 6,237,079 B1 | 5/2001 | Stoney | |
| 7,177,963 B2 | 2/2007 | Burns | |
| 7,549,089 B1 * | 6/2009 | Kimmel | G06F 11/1076 714/42 |
| 7,788,470 B1 | 8/2010 | Purcell | |
| 7,836,129 B2 | 11/2010 | Freimuth | |
| 9,560,109 B2 | 1/2017 | Wilson | |
| 10,540,219 B2 | 1/2020 | Tomlin | |
| 10,657,085 B2 | 5/2020 | Gainey, Jr. | |
| 2010/0100656 A1 * | 4/2010 | Gainey, Jr. | G06F 13/24 710/263 |
| 2016/0034324 A1 | 2/2016 | Liu | |
| 2019/0347228 A1 | 11/2019 | Gainey, Jr. | |
| 2020/0151037 A1 | 5/2020 | Gomes | |

FOREIGN PATENT DOCUMENTS

EP 2483757 B1 8/2012

OTHER PUBLICATIONS

Pending U.S. Appl. No. 17/122,346, entitled "Command-Type Filtering Based on Per-Command Filtering Indicator", filed Dec. 15, 2020, 55 Pages.
IBM: List of IBM Patents or Patent Applications Treated as Related (Appendix P), Nov. 18, 2022, 2 pages.

* cited by examiner

*Primary Examiner* — Syed A Roni
(74) *Attorney, Agent, or Firm* — Teddi E. Maranzano

(57) ABSTRACT

A method, computer program product, and computer system are provided. An operating system (OS) receives a status at completion of a cryptographic adjunct process (AP) instruction directed to an AP message queue on a cryptographic AP. The status includes a return code, a reason code, a queue full indicator, a queue empty indicator, and the count of enqueued request messages on the AP message queue. The OS determines a number of lost request messages on the AP message queue, based on a count of enqueued request messages on the AP message queue received in the status. The OS re-enqueues the number of lost request messages to the AP message queue. The OS recovers the number of lost request messages on the AP message queue.

20 Claims, 5 Drawing Sheets

AP COMMAND REQUEST MESSAGE 500

| HEADER 502 | SUB-HEADER 504 | PACKET – 0 506 | PACKET – 1 REQUEST CPRB 508 | PACKET – 1 REQUEST VRB 510 | PACKET – 2 REQUEST DB 512 |

FIG. 5A

AP COMMAND REPLY MESSAGE 530

| HEADER 532 | SUB-HEADER 534 | PACKET – 5 REPLY CPRB 536 | PACKET – 5 REPLY VRB 538 | PACKET – 6 REPLY DB 540 |

FIG. 5B

DETECTING AND RECOVERING LOST ADJUNCT PROCESSOR MESSAGES

BACKGROUND

The present invention relates to computer systems, and more specifically to detecting and recovering lost messages following an adjunct processor reset.

Each adjunct processor (AP) cryptographic (crypto) card includes one or more queues for transporting AP messages between the AP crypto card and the message sender. The operating system on the server to which the AP crypto card is attached communicates with the AP crypto card to manage the message queues using privileged instructions. The message queue depth of an AP message queue is a fixed length which can be discovered by the operating system. When enqueuing an AP request message causes the AP message queue to reach capacity, an AP queue full state is returned until at least one AP reply message is dequeued.

An external reset operation may be performed, thereby clearing all AP request messages and AP reply messages from the AP message queue. An application sending and receiving messages from the AP crypto card is not aware when an external reset operation is performed, and under some circumstances, neither is the operating system.

It would be advantageous to detect lost AP messages, determine the AP messages that were lost, and then recover only the AP request messages that were lost due to AP or machine malfunction, a timeout condition, or an AP queue reset.

SUMMARY

A method to recover lost messages is provided. An operating system (OS) receives a status at completion of a cryptographic adjunct process (AP) instruction directed to an AP message queue on a cryptographic AP. The status includes a return code, a reason code, a queue full indicator, a queue empty indicator, and the count of enqueued request messages on the AP message queue. The OS determines a number of lost request messages on the AP message queue, based on a count of enqueued request messages on the AP message queue received in the status. The OS re-enqueues the number of lost request messages to the AP message queue. The OS recovers the number of lost request messages on the AP message queue.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5A depicts one example of an Adjunct Processor Command Request Message, in accordance with one or more aspects of the present invention; and FIG. 5B depicts one example of an Adjunct Processor Command Reply Message, in accordance with one or more aspects of the present invention.

DETAILED DESCRIPTION

Figure 1A:
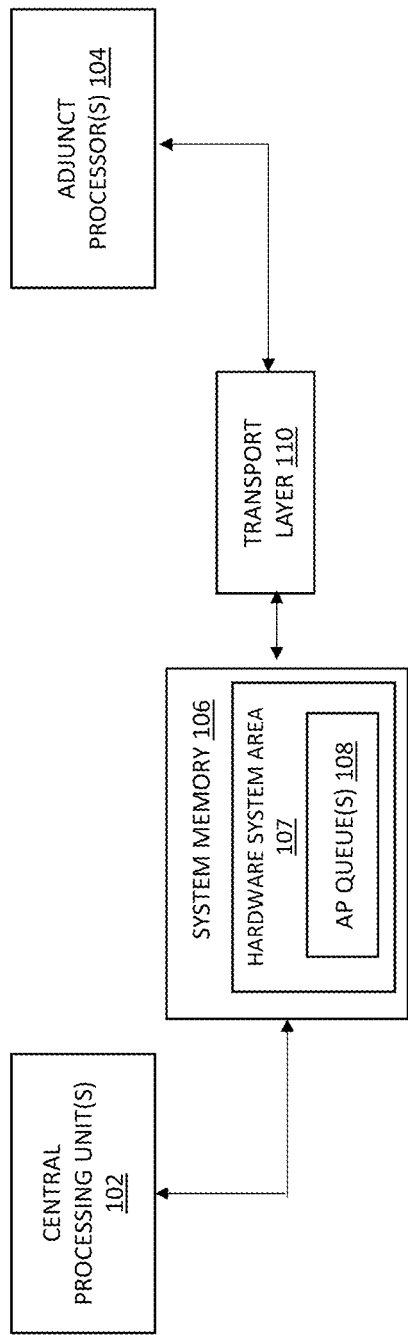
FIG. 1A depicts one example of a computing environment to incorporate and use one or more aspects of the present invention.

A cluster of hypervisors (systems) is established to provide physical machine capabilities to one or more virtual machines (VM). Each of the hypervisors executes on a computer, and has available to it all of the functions and facilities (also referred to herein collectively as "resources") of the computer on which it is executing. The resources include software instructions, machine code instructions, microcode and millicode instructions, and/or physical hardware capabilities, including one or more Cryptographic Express PCIe (CEX) AP crypto adapters. The hypervisors expose a set of the resources to the VMs, and provide a mechanism for ensuring that operations and modifications of the VMs occur in a controlled and predictable manner.

Embodiments of the present invention may be implemented on computer hardware and software that support VMs that are configured with AP crypto adapters. Here, the contexts of z/VM® and z/Architecture® are used to facilitate understanding of the elements of the present invention. (z/VM® and z/Architecture® are registered trademarks of IBM in the United States).

Conceptually, an AP crypto adapter is assigned a unique number, which is its adjunct processor number (APn 0-255). Within each APn there may be assigned up to 256 logically independent processing facilities known as domains. The APn and Domain number pair uniquely identifies an AP crypto resource with which to process work. Each such pair is served by a work queue which may comprise up to 32 elements, with each element containing at most one request message or its corresponding reply message. The number of APn and elements are exemplary, and may vary to include more or fewer, depending on the architectural implementation. Each such queue is known as an AP queue (APQ) and is uniquely identified by the APn and Domain number of the resource it serves. The concatenated AP and Domain numbers may be referred to as the APQN.

The APQNs may be externally configured and reset from an administrative console, also referred to as a hardware support element, without synchronous information being sent to the program of the event. Although programs may maintain their own accounting of numbers of messages in progress with each APQN, a program's accounting of its message count may not match the actual hardware APQN message count as a result of the external reset or a timeout condition. In this context, a program may refer to an application program.

This mis-match between the program's AP queue message count and the AP actual queue message count may continue for an indefinite number of processing cycles until the program eventually experiences an error, for example a program hang, waiting for a non-existent reply. As another example, the program may attempt to enqueue a message to the APQN, but receive a "queue full" indicator because the program AP queue message count erroneously indicates space is available for the new message. As a further example, the program may attempt, in error, to dequeue a reply but receive a "queue empty" indicator because of an AP queue message count mismatch. When the program receives these types of errors, recovery comprises resetting the affected APQN and restarting the failed program environment. This causes requeuing all the messages to that APQN, since the program is not aware which messages were successfully processed prior to the reset. The three z/Architecture AP instructions may be implemented in millicode because they are both privileged and complex, thereby being an inefficient use of computing resource to have to repeat work for recovery. Therefore, embodiments of the present invention ensure that the program discovers message losses, co-incidentally with the next attempt to enqueue a message to the APQN.

In an embodiment, the AP hardware architecture is enhanced to return a count of the messages enqueued on the target APQN at the completion of the execution of one of the three z/Architecture AP instructions (PQAP-TAPQ, DQAP, NQAP). The operating system (OS) maintains a count of AP messages that it has enqueued but has not yet dequeued from the target APQN. When the OS receives the current hardware AP queue message count (i.e., a hardware message count) from the target APQN, the OS compares its OS AP queue message count (i.e., a software message count) with the hardware message count. If the software message count is greater than the hardware message count, then the OS assumes one or more AP messages are lost from the target AP message queue. The OS subtracts the hardware message count from the software message count, and uses that difference to initiate recovery of the lost AP messages.

The OS calculates the lost AP queue message count (lost message count) based on the software message count and the hardware message count, and which AP messages are lost based on its own OS AP queue message enqueue timestamp as well as the current state of the AP queue.

The OS storage includes a lost AP queue message buffer to relocate all the lost AP messages into the lost AP queue message buffer of the CPU that detected the lost AP messages. There is a one-to-one correspondence between a lost AP queue message buffer and a CPU. The OS then deletes the lost AP messages from the OS AP message buffer. The OS relocates all the lost AP messages into the lost AP queue message buffer of the CPU that detected the lost AP messages. As a result, the messages in the OS AP message buffer are the same messages that are in the message queue of the target APQN.

The OS also sets a lost AP queue message indicator to let the recovery service know that the lost AP queue message buffer of the CPU that detected the lost AP message condition contains lost AP messages to be recovered.

The OS periodically dispatches the recovery service, which scans each lost AP queue message buffer to see if there are lost AP messages that need to be recovered. If there are lost AP messages to be recovered, then the OS behaves like an application program, in that the OS takes the lost AP messages that are in the selected lost AP queue message buffer, selects an AP message one at a time and calls the NQAP service to enqueue the selected AP message using the credentials of the program that initially enqueued the AP message.

The three z/Architecture AP instructions use the APQN to address a specific processing cryptographic resource. Of the three instructions:

NQAP (Enqueue Adjunct Processor) places a request message on an addressed APQN. Status information is returned in the adjunct processor AP queue status word (APQSW) to indicate the success of the request. Once the request is placed on the APQN, the NQAP instruction completes and the message request is processed asynchronously. A work request may be delivered as a number of segments, each requiring separate NQAP instructions. Where multiple segments are needed, the instruction returns the AP queue index or entry number (APEX) on successfully receiving the first segment. Subsequent segments require that the associated APEX be specified with the request. When an entire message is assembled, the AP crypto adapter is able to be process it. Segmenting may occur at the instigation of either the program or the machine.

DQAP (Dequeue Adjunct Processor) removes the next ready reply message from the addressed APQN. Status information is returned in the APQSW to indicate the success of the reply. Once a reply has been successfully removed, the associated queue element of the AP queue becomes free to be used for a subsequent request. Replies may be returned in multiple segments, each requiring a separate DQAP to receive each segment. The first DQAP returns the APEX, which each subsequent DQAP specifies to retrieve the remaining message segments.

PQAP (Process Queue Adjunct Processor) is used in a number of querying and configuration functions relating to individual APQNs, or the entire set of APs and Domains assigned to the program. Once such query function is Test AP Queue (TAPQ), which returns configuration and operational status information about the APQN. The TAPQ function also returns whether the associated queue is full or empty and whether the queue is configured for adapter interruptions. This information may be returned in one of the general purpose register operands used.

NQAP, DQAP and PQAP-TAPQ return some information about the state of the APQN in the APQSW, such as a response code and the count of the messages enqueued on the target APQN at the completion of the execution of the instruction. A partially filled queue will have both "E" and "F" bits set to zero, since the queue is neither empty nor full. Only a full queue will have the "F" bit set and only an empty queue will have the "E" bit set. Note in particular, a successful NQAP cannot have the "E" bit set, nor can both the "E" and the "F" bits be set simultaneously.

Other status indicators include a reply code that is used to indicate success in initiating the request, which occurs asynchronously. There are also a return code and reason code that the AP crypto card issues to indicate the success of executing the request. The APQSW is returned to the program following the completion of the AP instruction. Other common methods to recognize an error condition, such as exceeding an operation timeout threshold may be used to recognize that message recovery is needed.

From the program perspective, replies to requests are delivered asynchronously, hence the need for a success indication for initiation, a reply code, and a success indication for completion. The requests are delivered to an internal queue in the computer's hardware system area. A separate piece of computer firmware processes that queue. Following validation, the request is sent to firmware on the AP crypto card, which routes the request to the AP crypto card's crypto chip, or one of the crypto chip's agents. Failure indicators, reply codes and reason codes may be returned as a reply to the message initiation.

Although the present invention is described with respect to cryptographic message queuing capabilities, it could readily be applied to other capabilities of a computing system, such as message queuing in an I/O subsystem.

Referring now to the figures, FIG. 1A depicts one example of a computing environment to incorporate and use one or more aspects of the present invention. The computing environment includes at least one central processing unit 102 and at least one adjunct processor (AP) 104, each of which is coupled to at least a portion of memory, referred to as system memory 106. System memory 106 includes a hardware system area 107, which is indirectly accessible and not visible to programs executing on the central processing unit(s). Indirectly accessible is used herein to mean that the hardware system area 107 and the AP queue(s) 108 stored therein (described below) are only accessible by specific limited instructions and not otherwise accessible. For example, programs cannot load into the hardware system area 107 and are not aware of addresses within it. Located within the system memory 106 are one or more AP queues 108. These queues are not directly visible from user programs and are instead considered a part of the machine (i.e., the machine that includes the central processing unit(s), system memory and adjunct processor(s)). A central processing unit 102 has access to the AP queues 108 in system memory 106 by, for instance, issuing instructions, including instructions to place requests on the queue, and/or to remove replies from the queue. The AP 104, however, does have direct access to the queues via, e.g., a transport layer 110 (e.g., i390CO), and is responsible for taking requests off the queue, processing the requests, and placing replies to the requests on the queue.

Figure 1B:
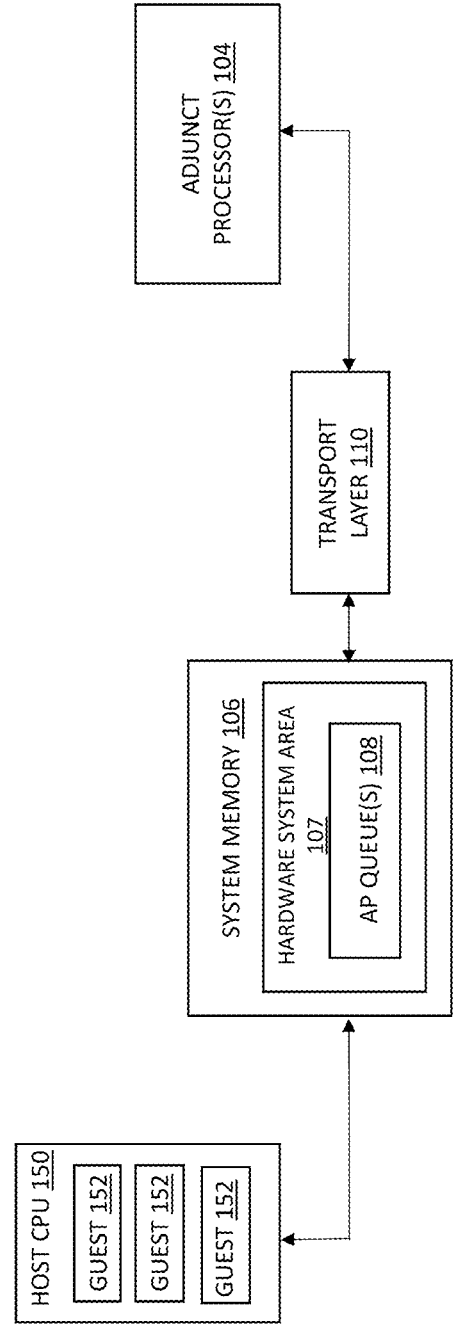
FIG. 1B depicts another example of a computing environment to incorporate and use one or more aspects of the present invention.

FIG. 1B depicts another example of a computing environment to incorporate and use one or more aspects of the present invention. In this embodiment, the machine includes virtual support, and there is at least one host central processing unit 150 that includes a plurality of guests 152 (e.g., guest operating systems and/or guest programs). The host central processing unit 150 is coupled to at least a portion of system memory 106. Additionally, there is at least one AP processor 104, which is also coupled to system memory 106 via, for instance, a transport layer 110. As one example, system memory 107 includes a hardware system area 107, and located within the system memory 106 are one or more AP queues 108. As in FIG. 1A, the one or more AP queues 108 are not directly visible from user programs, but are accessible through privileged instructions issued by the operating system.

As indicated, there are different types of adjunct processors, including but not limited to, cryptographic cards or adapters. A specific example of a cryptographic card is a Crypto Express card offered by International Business Machines Corporation, Armonk, N.Y. Although an example cryptographic card is provided, other cryptographic cards offered by International Business Machines Corporation and/or other companies may incorporate and/or use one or more aspects of the present invention. Further, other types of adjunct processors may incorporate and/or use one or more aspects of the present invention.

In one embodiment, an adjunct processor, such as a cryptographic card (e.g., a Crypto Express card), supports a plurality of modes including, but not limited to, a Common Cryptographic Architecture (CCA) co-processor mode, an accelerator mode, and an Enterprise Public Key Cryptographic Standards (PKCS) mode (e.g., XCP/EP11—Enterprise PKCS #11), as examples. Additional, fewer and/or other modes may be supported in other examples. Each of the modes may have its own AP message structures and formats.

As an example, an adjunct processor message is comprised of multiple data segments and the data segments may not be adjacent to each other; instead, one or more may be interleaved. In one example, a cryptographic card does not have direct access to the enqueued AP message and a portion of the message (e.g., the bottom part of the AP message) contains the data to be used by, e.g., the cryptographic card to execute the AP command. Therefore, the AP command transport layer (e.g., transport layer 110) copies the relevant data from the AP command request message, packages it in a format that is compatible with the cryptographic AP (e.g., crypto card's command request message) and sends it to the cryptographic card. Similarly, after the AP command is executed by the cryptographic card, the cryptographic card generates a cryptographic card command reply message that includes, e.g., packets 5 and 6 of FIG. 5B, and sends it to the AP command transport layer 110, which re-packages it into an AP command reply message. For instance, the transport layer 110 uses various parts of the AP command request message and the cryptographic card's command reply message to provide the AP command reply message, including the header, sub-header and packets. The transport layer then sends the AP command reply message to the AP queue to be dequeued later by the program. Further details of an AP command request message and an AP command reply message are described next with reference to FIGS. 5A and 5B.

FIG. 5A depicts an example of an Adjunct Processor Command Request Message, in accordance with one or more aspects of the present invention.

In one example, an AP command request message 500 includes a header 502, a sub-header 504, and a plurality of packets 506-512. In one example, one or more of the packets (e.g., one or more of packet-1 508-510) is configured to provide a command and one or more of the packets (e.g., packet-2 512) is configured to provide input data. One of the packets includes a request connectivity programming request block (CPRB) 508 that includes one or more indicators related to command-type filtering, as well as other indicators, flags, bits, etc.

FIG. 5B depicts an example of an Adjunct Processor Command Reply Message, in accordance with one or more aspects of the present invention.

In response to a message, a reply is provided, and in one example, is in the form of an AP command reply message, an example of which is depicted in FIG. 5B. As shown, an AP command reply message 530 includes, for instance, a header 532, a sub-header 534, and a plurality of packets 536-540. One of the packets includes a reply CPRB 536 that includes a reply to the request and may indicate an error, such as a return code or a reason code.

Although specific fields, locations of fields, sizes of fields, bits and values of fields or bits are described in one embodiment herein for the Process Adjunct Processor Queue instruction and its associated registers, other fields, locations of fields, sizes of fields, bits and/or values of fields or bits may be used without departing from a spirit of one or more aspects of the invention. Fields and/or bits of each of the general registers not described herein may be blank, have a predefined value (e.g., zero), and/or include values to be ignored in one embodiment. Many possibilities exist.

Figure 2:
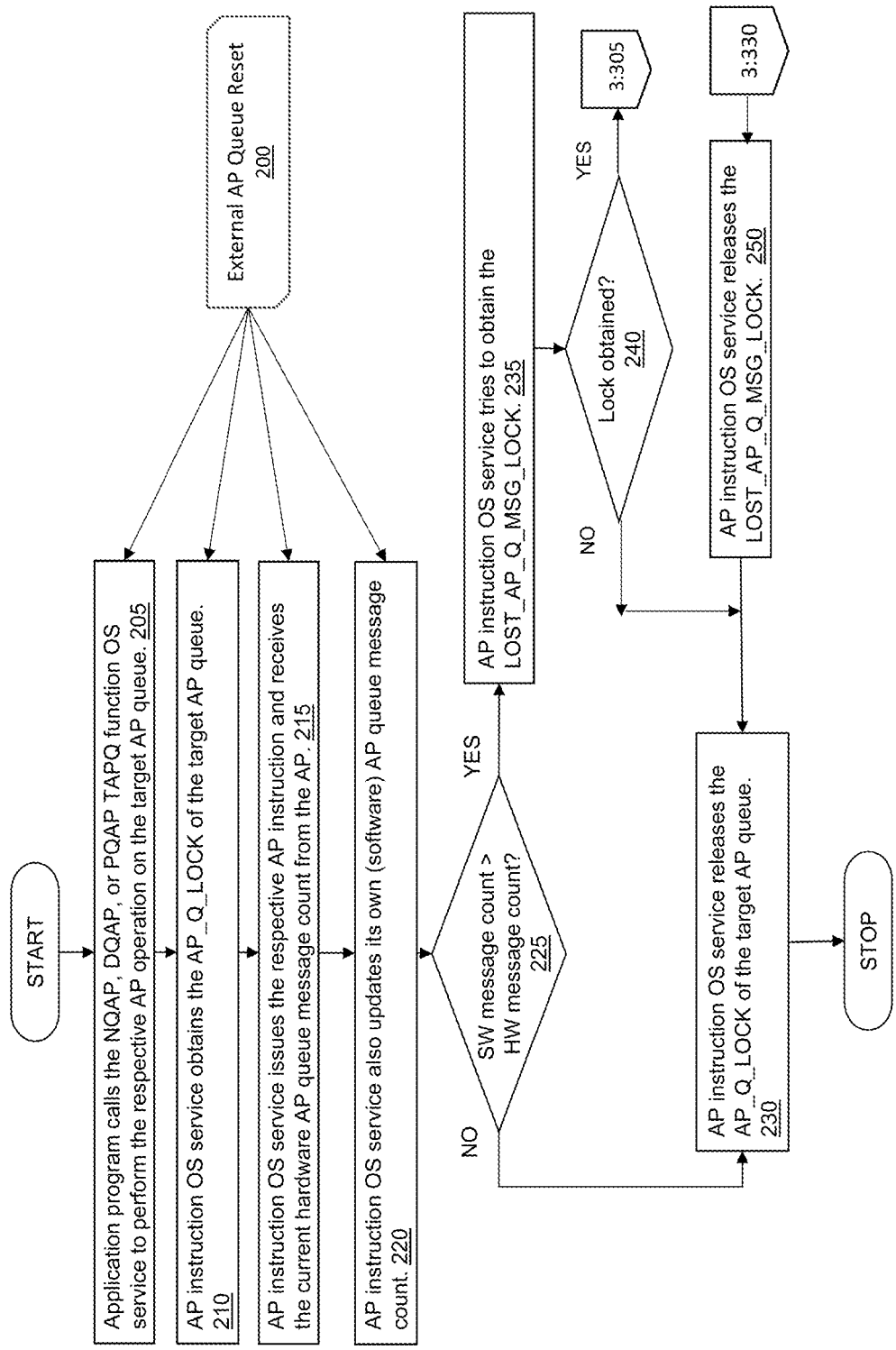
FIG. 2 illustrates a flow of detecting lost AP queue messages, according to one or more aspects of the present invention.

Turning now to FIG. 2, a flow of detecting and recovering lost AP queue messages is shown, according to one or more aspects of the present invention.

An administrator having the appropriate security permissions, may perform an external AP queue reset 200 of one or more APQNs from a hardware support element, resulting in the clearing of all enqueued messages on the target APQN(s).

As shown, the external AP queue reset (reset) 200 may occur at any point in FIG. 2, such as at 205-220. At 205, the reset 200 may occur while the program is executing NQAP, DQAP, or PQAP instruction. The reset 200 may also occur at 210. In this case, the OS is obtaining the AP_Q_LOCK to serialize access to the target AP message queue for either a DQAP or NQAP operation. Serialization may be performed in any manner consistent with the serialization process architected for the OS and computer processor. At 215, the reset 200 may occur after the OS receives the APQSW at the completion of a NQAP, DQAP, or PQAP instruction. Along with the APQSW, the AP crypto card returns the hardware message count at the completion of the instruction. The reset 200 may also occur following the completion of the instruction, or while at 220, the OS updates its software message count.

At 225, the OS compares the software message count to the hardware message count. The OS still holds the AP_Q_LOCK. If, at 225, the software message count is not greater than the hardware message count, the OS assumes that recovery is not needed, and the process ends at 230 where the OS releases the AP_Q_LOCK. If at 225 the software message count is greater than the hardware message count, the OS assumes that recovery is needed because at least one message is lost on the target AP message queue. To start recovery, at 235 the OS tries to obtain the LOST_AP_Q_MSG_LOCK for the lost AP queue message buffer associated with the target APQN.

Figure 3:
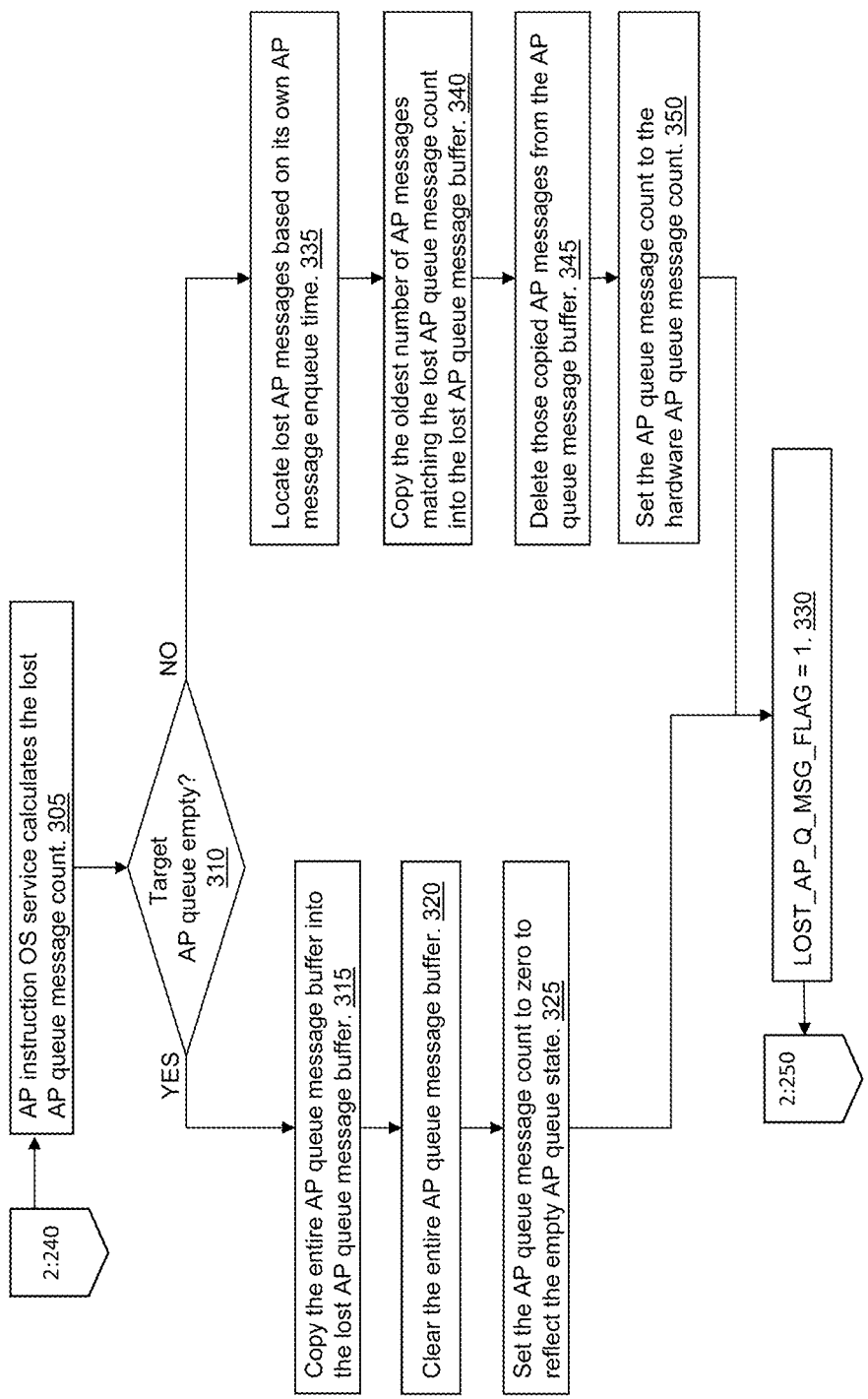
FIG. 3 illustrates a flow of clearing the lost AP messages condition, according to one or more aspects of the present invention.

If, at 240, the OS obtains the LOST_AP_Q_MSG_LOCK, processing continues in FIG. 3, which illustrates a flow of clearing the lost AP messages condition. If, at 240, the OS does not obtain the LOST_AP_Q_MSG_LOCK, processing continues to 230, where the OS releases the AP_Q_LOCK of the target AP message queue.

FIG. 3 illustrates a flow of clearing the lost AP messages condition.

At 305, the OS calculates the lost message count based on the difference between the software message count and the hardware message count, the enqueue time of the messages, and the state of the target AP message queue.

If at 310, the queue empty indicator is set, then the target AP message queue is empty. At 315, the OS copies the contents of the OS AP message buffer into the lost AP queue message buffer of the CPU that detected the lost AP messages. There is one lost AP queue message buffer for each CPU in the configuration. At 320, the OS clears the OS AP message buffer corresponding to the target APQN, and sets the software message count to zero (325). After this operation, the OS AP message buffer reflects the queue empty state of the hardware message queue. The OS sets the LOST_AP_Q_MSG_FLAG to indicate to the recovery service that the lost AP queue message buffer of the CPU that detected the lost AP queue message condition requires a recovery action.

Returning to 310, if the target AP message queue is not empty, then only a portion of the AP queue messages were lost. This may be due to a timeout condition where the reply was not received within a time threshold. At 335, the OS locates lost AP messages based on the enqueue timestamp of messages on the OS AP message buffer. At 340, the OS copies the oldest (based on enqueue time) number of AP messages matching the lost message count into the lost AP queue message buffer of the CPU that detected the lost AP queue message condition. At 345, the OS deletes those copied AP messages from its OS AP message buffer and sets its own software message count to the hardware message count (350). At 330 the OS sets the LOST_AP_Q_MSG_FLAG to indicate to the recovery service that the lost AP queue message buffer of the CPU that detected the lost AP queue message condition requires a recovery action. The process returns to FIG. 2 at 250, where the OS releases the LOST_AP_Q_MSG_LOCK of the target lost AP queue message buffer associated with the target APQN. At 230, the OS releases the AP_Q_LOCK of the target AP message queue. As a result, the lost AP messages condition is cleared, and the OS continues servicing AP queue message requests as they are received from application programs.

Figure 4:
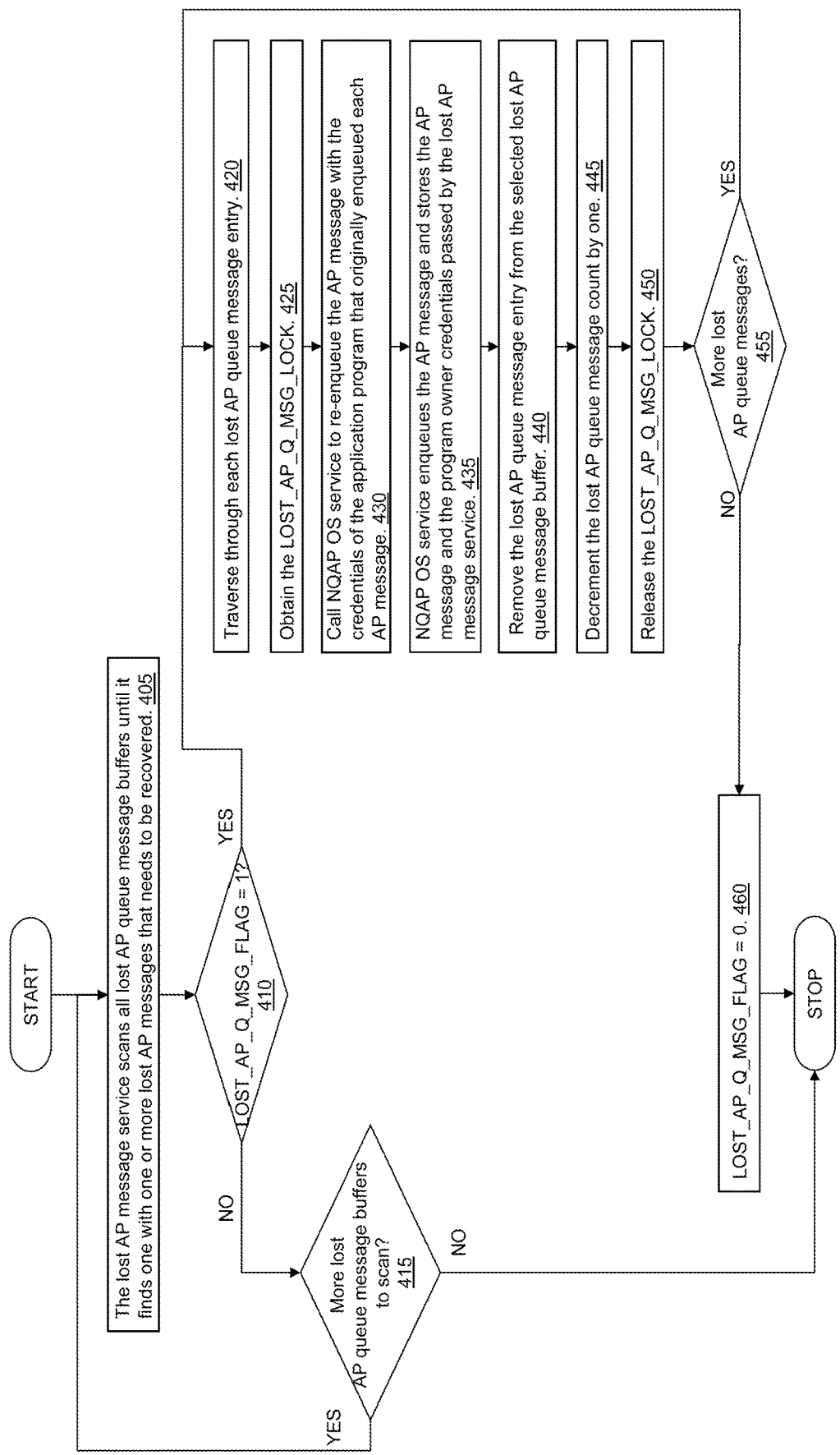
FIG. 4 illustrates a flow of the lost AP message recovery service, according to one or more aspects of the present invention.

FIG. 4 illustrates a flow of the lost AP message recovery service (recovery service). The OS periodically dispatches the lost AP message recovery service which scans all lost AP queue message buffers until it finds a lost AP queue message buffer with the LOST_AP_Q_MSG_FLAG set.

At 405, the recovery service begins a circular scan of all the lost AP queue message buffers. The circular scan starts at an arbitrary buffer, and searches each buffer until a buffer with the LOST_AP_Q_MSG_FLAG set is found, or the circular scan reaches the starting buffer again.

If, at 410, the recovery service finds a buffer with the LOST_AP_Q_MSG_FLAG set, then at 420 the recovery service processes the messages on that lost AP queue message buffer. At 425, the recovery service obtains the LOST_AP_Q_MSG_LOCK for the lost AP queue message buffer. This is to ensure that only this instance of the recovery service modifies this lost AP queue message buffer. At 430, the recovery service invokes the NQAP privileged instruction to re-enqueue each of the lost AP messages that are in the selected lost AP queue message buffer. The recovery service mimics the application program by re-enqueuing each of the lost AP messages that are in the selected lost AP queue message buffer, using the credentials of the application program that originally enqueued each AP message. These credentials may be any factors that uniquely identify the original program. At a minimum, the credentials include a program name and an instance identifier or process identifier. This makes the re-enqueued AP message appear to be identical to the original (lost) AP message; that is, as if the original owner of the AP message had enqueued it and the re-enqueue never occurred. While the recovery service executes NQAP instructions, the OS may continue to service new incoming AP instructions from applications. At 435, the NQAP privileged instruction enqueues the AP message and stores the credentials of the original program with the message. At 440, the recovery service removes the re-enqueued AP queue message entry from the lost AP queue message buffer, and the lost AP queue message count is decremented by one (445). The recovery service releases the LOST_AP_Q_MSG_LOCK at 450. The recovery service returns to 420 to process the next message on the lost AP queue message buffer (455) if there are more messages on this particular lost AP queue message buffer.

Returning to 410, if the LOST_AP_Q_MSG_FLAG is not set and this is not the last lost AP queue message buffer, the recovery service, at 415, advances to the next lost AP queue message buffer. After the recovery service scans each of the lost AP queue message buffers, the LOST_AP_Q_MSG_FLAG is unset, at 460.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A method to recover lost messages, comprising:
    receiving by an operating system (OS), a status at a completion of a cryptographic adjunct process (AP) instruction directed to an AP message queue on a cryptographic AP, wherein the status includes a count of enqueued request messages on the AP message queue;
    determining by the OS a number of lost request messages on the AP message queue, based on the count of enqueued request messages on the AP message queue received in the status;
    re-enqueuing by the OS the number of lost request messages to the AP message queue; and
    recovering by the OS the number of lost request messages on the AP message queue.

2. The method of claim 1, wherein the determining by the OS further comprises:
    subtracting the count of enqueued request messages on the AP message queue from an OS count of enqueued request messages, wherein a difference is the number of lost request messages.

3. The method of claim 1, wherein the OS re-enqueuing further comprises:
    serializing access to one of a plurality of lost message buffers, wherein a one-to-one correspondence exists between the lost message buffer and a Central Processing Unit (CPU);
    copying a number of oldest messages from the OS AP message queue to the lost message buffer, wherein the number of oldest messages is the number of lost request messages on the AP message queue;
    deleting the copied oldest messages from the OS AP message queue;
    setting an OS count of enqueued request messages to zero; and
    setting a lost message indicator on the lost message buffer.

4. The method of claim 1, wherein the OS recovering the number of lost request messages further comprises:
    periodically dispatching a recovery service, wherein the recovery service performs a circular scan of each of a plurality of lost message buffers;
    based on a lost message indicator being set on the lost message buffer, the recovery service serializing access to the AP message queue;
    for each of an entry on the lost message buffer:
        formatting by the recovery service an enqueue request message packet using a format compatible with the cryptographic AP;
        passing by the recovery service to the OS a request to execute an enqueue operation, wherein the enqueue operation includes the request message packet and credentials identifying an application program as a caller;
        decrementing by the recovery service the count of enqueued request messages by one;
        removing by the recovery service the entry from the lost message buffer; and
        clearing the lost message indicator on the lost message buffer.

5. The method of claim 4, wherein the recovery service is used for a lost message recovery on the AP message queue instead of a cryptographic AP instruction set, therein allowing the lost message recovery to operate in parallel with application program requests to the cryptographic AP.

6. The method of claim 1, wherein the AP message queues are stored in a hardware system area of computer system memory, and wherein the AP message queues are directly accessible only by the OS and by the cryptographic AP.

7. The method of claim 1, wherein a timestamp is stored when the AP message is enqueued on the AP message queue, and wherein the timestamp is used to determine the oldest messages on the OS AP message queue.

8. A computer program product to recover lost messages, the computer program product comprising a non-transitory tangible storage device having program code embodied therewith, the program code executable by a processor of a computer to perform a method, the method comprising:
    receiving by an operating system (OS), a status at a completion of a cryptographic adjunct process (AP) instruction directed to an AP message queue on a cryptographic AP, wherein the status includes a count of enqueued request messages on the AP message queue;
    determining by the OS a number of lost request messages on the AP message queue, based on the count of enqueued request messages on the AP message queue received in the status;
    re-enqueuing by the OS the number of lost request messages to the AP message queue; and
    recovering by the OS the number of lost request messages on the AP message queue.

9. The computer program product of claim 8, wherein the determining by the OS further comprises:
    subtracting the count of enqueued request messages on the AP message queue from an OS count of enqueued request messages, wherein a difference is the number of lost request messages.

10. The computer program product of claim 8, wherein the OS re-enqueuing further comprises:
    serializing access to one of a plurality of lost message buffers, wherein a one-to-one correspondence exists between the lost message buffer and a Central Processing Unit (CPU);
    copying a number of oldest messages from the OS AP message queue to the lost message buffer, wherein the number of oldest messages is the number of lost request messages on the AP message queue;
    deleting the copied oldest messages from the OS AP message queue;
    setting an OS count of enqueued request messages to zero; and
    setting a lost message indicator on the lost message buffer.

11. The computer program product of claim 8, wherein the OS recovering the number of lost request messages further comprises:
    periodically dispatching a recovery service, wherein the recovery service performs a circular scan of each of a plurality of lost message buffers;
    based on lost message indicator being set on the lost message buffer, the recovery service serializing access to the AP message queue;
    for each of an entry on the lost message buffer:
        formatting by the recovery service an enqueue request message packet using a format compatible with the cryptographic AP;
        passing by the recovery service to the OS a request to execute an enqueue operation, wherein the enqueue operation includes the request message packet and credentials identifying an application program as a caller;

decrementing by the recovery service the count of enqueued request messages by one;

removing by the recovery service the entry from the lost message buffer; and clearing the lost message indicator on the lost message buffer.

12. The computer program product of claim 11, wherein the recovery service is used for a lost message recovery on the AP message queue instead of a cryptographic AP instruction set, therein allowing the lost message recovery to operate in parallel with application program requests to the cryptographic AP.

13. The computer program product of claim 8, wherein the AP message queues are stored in a hardware system area of computer system memory, and wherein the AP message queues are directly accessible only by the OS and by the cryptographic AP.

14. The computer program product of claim 8, wherein a timestamp is stored when the AP message is enqueued on the AP message queue, and wherein the timestamp is used to determine the oldest messages on the OS AP message queue.

15. A computer system to recover lost messages, the computer system comprising:

one or more processors;

a memory coupled to at least one of the processors;

a set of computer program instructions stored in the memory and executed by at least one of the processors in order to perform actions of:

receiving by an operating system (OS), a status at a completion of a cryptographic adjunct process (AP) instruction directed to an AP message queue on a cryptographic AP, wherein the status includes a count of enqueued request messages on the AP message queue;

determining by the OS a number of lost request messages on the AP message queue, based on the count of enqueued request messages on the AP message queue received in the status;

re-enqueuing by the OS the number of lost request messages to the AP message queue; and recovering by the OS the number of lost request messages on the AP message queue.

16. The computer system of claim 15, wherein the determining by the OS further comprises:

subtracting the count of enqueued request messages on the AP message queue from an OS count of enqueued request messages, wherein a difference is the number of lost request messages.

17. The computer system of claim 15, wherein the OS re-enqueuing further comprises:

serializing access to one of a plurality of lost message buffers, wherein a one-to-one correspondence exists between the lost message buffer and a Central Processing Unit (CPU);

copying a number of oldest messages from the OS AP message queue to the lost message buffer, wherein the number of oldest messages is the number of lost request messages on the AP message queue;

deleting the copied oldest messages from the OS AP message queue;

setting an OS count of enqueued request messages to zero; and setting a lost message indicator on the lost message buffer.

18. The computer system of claim 15, wherein the OS recovering the number of lost request messages further comprises:

periodically dispatching a recovery service, wherein the recovery service performs a circular scan of each of a plurality of lost message buffers;

based on a lost message indicator being set on the lost message buffer, the recovery service serializing access to the AP message queue;

for each of an entry on the lost message buffer:

formatting by the recovery service an enqueue request message packet using a format compatible with the cryptographic AP;

passing by the recovery service to the OS a request to execute an enqueue operation, wherein the enqueue operation includes the request message packet and credentials identifying an application program as a caller;

decrementing by the recovery service the count of enqueued request messages by one;

removing by the recovery service the entry from the lost message buffer; and clearing the lost message indicator on the lost message buffer.

19. The computer system of claim 18, wherein the recovery service is used for a lost message recovery on the AP message queue instead of a cryptographic AP instruction set, therein allowing the lost message recovery to operate in parallel with application program requests to the cryptographic AP.

20. The computer system of claim 15, wherein a timestamp is stored when the AP message is enqueued on the AP message queue, and wherein the timestamp is used to determine the oldest messages on the OS AP message queue.

* * * * *